United States Patent
Kini et al.

(10) Patent No.: US 11,958,925 B2
(45) Date of Patent: Apr. 16, 2024

(54) PROCESS FOR PREPARATION OF SUPERABSORBENT POLYMER

(71) Applicant: UPL LTD, Mumbai (IN)

(72) Inventors: Prashant Vasant Kini, Mumbai (IN); Vilas Manikant Mukadam, Mumbai (IN); Janardan Ramnihor Tiwari, Mumbai (IN)

(73) Assignee: UPL LTD, Mumbai (IN)

( * ) Notice: Subject to any disclaimer, the term of this patent is extended or adjusted under 35 U.S.C. 154(b) by 0 days.

(21) Appl. No.: 17/800,662

(22) PCT Filed: Feb. 17, 2021

(86) PCT No.: PCT/IB2021/051324
§ 371 (c)(1),
(2) Date: Aug. 18, 2022

(87) PCT Pub. No.: WO2021/165842
PCT Pub. Date: Aug. 26, 2021

(65) Prior Publication Data
US 2023/0074309 A1    Mar. 9, 2023

(30) Foreign Application Priority Data
Feb. 20, 2020  (IN) .............................. 202021007334

(51) Int. Cl.
*C08F 251/00*  (2006.01)
(52) U.S. Cl.
CPC ................................. *C08F 251/00* (2013.01)
(58) Field of Classification Search
CPC ................... C08F 251/00; C08J 3/12
USPC ................................................ 525/54, 240
See application file for complete search history.

(56) References Cited

U.S. PATENT DOCUMENTS

| 7,607,259 B2 * | 10/2009 | Savich .................. A01G 24/35 47/58.1 R |
| 8,507,607 B2 | 8/2013 | Chambers |
| 2010/0311904 A1 * | 12/2010 | Chambers ............ C08B 31/006 525/54.31 |

FOREIGN PATENT DOCUMENTS

| CN | 1068339 A | * | 1/1993 |
| CN | 1068339 A | | 1/1993 |
| CN | 106046261 A | * | 10/2016 |
| CN | 106046261 A | | 10/2016 |
| WO | 2019011793 A1 | | 1/2019 |

OTHER PUBLICATIONS

Nakason et al. "Preparation of cassava starch-graft-polyacrylamide superabsorbents and associated composites by reactive blending", Carbohydrate Polymers, vol. 81, pp. 348-357 (Year: 2010).*
International Search Report and Written Opinion for International Application PCT/IB2021/051324; International Filing Date: Feb. 17, 2021; dated May 21, 2021; 15 pages.
Omidian, H. et al.; "Modified acrylic-based superabsorbent polymers (dependence on particle size and salinity)"; Polymer, vol. 40; 1999; pp. 1753-1761.

* cited by examiner

*Primary Examiner* — Michael M. Bernshteyn
(74) *Attorney, Agent, or Firm* — CANTOR COLBURN LLP

(57) ABSTRACT

The present invention relates to a process for preparation of superabsorbent polymer with high fluid absorptivity. The present invention also relates to a composition comprising said superabsorbent polymer and their use for absorbing aqueous fluids, for example in the agricultural industry.

7 Claims, No Drawings

PROCESS FOR PREPARATION OF SUPERABSORBENT POLYMER

CROSS REFERENCE TO RELATED APPLICATIONS

This application is a National Stage application of PCT/IB2021/051324, filed Feb. 17, 2021, which claims the benefit of Indian Patent Application No. 202021007334 filed Feb. 20, 2020, both of which are incorporated by reference in their entirety herein.

FIELD OF INVENTION

The present invention relates to a process for preparation of superabsorbent polymer with high fluid absorptivity. The present invention also relates to a composition comprising said superabsorbent polymer and their use for absorbing aqueous fluids, for example in the agricultural industry.

BACKGROUND OF INVENTION

Superabsorbent polymers absorb water or fluids several times their weight. Superabsorbent polymer(s) (SAP) improve supply of water in the soil and therefore used in agriculture. Various superabsorbent polymers are known in the art. Such superabsorbent polymers may be made from polyacrylamide copolymer, cross-linked carboxymethylcellulose, polyvinyl alcohol copolymers, cross-linked polyethylene oxide, starch grafted copolymer of polyacrylonitrile etc. The water absorbance of most superabsorbent polymers has been known to decrease considerably in the presence of salts. Soil incorporated superabsorbent polymers or those that are mixed with fertilizers have been known to suffer from decreased absorbance capacity due to the presence of salts in the soil or fertilizer. Studies have been carried out to study the effect of such salts such as those carried out by Daniel C. Bowman, Richard Y. Evans, and J. L. Paul., J. Amer. Soc. Hort. Sci. May 1990 115:382-386, Fertilizer Salts Reduce Hydration of Polyacrylamide Gels and Affect Physical Properties of Gel-amended Container Media. The paper discusses the decrease in polymer absorption capacity when mixed with salts. It was observed that soluble salts dramatically affect absorption by hydrophilic polyacrylamide gels.

Agriculture requires the use of many compounds to ensure good yields and healthy crops. Most of the fertilizers and nutrients added to the soil are salts that in some way contribute to the improvement in the crops. Salts are also naturally present in the soil, which also contribute to the increased salinity of the soil. In drought prone areas and areas where water management is essential, the salinity in the soil is higher, as water required to wash these salts away is scarce. In such soils, where water is scarce or where water management is required or even where normal salts are added to the soil, addition of superabsorbent polymers may not result in the desired effect that is, increased water availability. Salts in the environment around the superabsorbent polymer influence the performance capacity of the polymer. The known preparation process for such super absorbent polymers includes a process by reverse phase suspension polymerization and a process by aqueous solution polymerization. U.S. Pat. No. 7,459,501 discloses and claims a process for preparing SAP wherein SAP is prepared by graft polymerizing a monomer on starch in the presence of a thermal initiator like ammonium persulfate at 170° F.

U.S. Pat. No. 8,507,607 discloses a continuous process for graft polymerizing a carbohydrate with one $\alpha$, $\beta$-unsaturated carboxylic acid derivative in the presence of a catalyst wherein the polymerization is thermally initiated polymerization under substantially adiabatic conditions. WO2019/011793 relates to a process for producing superabsorbent polymer particles, comprising surface postcrosslinking, classifying the surface postcrosslinked superabsorbent polymer particles, deagglomerating the separated oversize fraction using a roll crusher and recycling the disintegrated oversize fraction before or into the classification of the surface postcrosslinked superabsorbent polymer particles.

Thus, there is a need in the art for simple and industrially viable process of preparing superabsorbent polymer in granular form. Accordingly, the present invention provides a feasible and economical route for preparation of superabsorbent polymer by overcoming the problem faced during the preparation of SAP. Surprisingly it has been found that the present invention provides super absorbent polymer with desired properties specifically the particles of super absorbent polymer have high absorbance capacity and retention properties for aqueous fluids.

SUMMARY OF THE INVENTION

In an aspect the present invention provides a process for preparation of superabsorbent polymer.

It is another aspect of the present invention to provide an efficient method for the production of a superabsorbent polymer which shows increase in production capacity, is simple, cost effective and environmental friendly technique.

It is another object of the present invention to provide a superabsorbent polymer having a high water absorbing capacity.

In another aspect the present invention provides a process for preparation of superabsorbent polymer comprising graft polymerizing a monomer on starch in presence of a redox catalytic system.

In another aspect the present invention provides a process for preparation of superabsorbent polymer comprising graft polymerizing a monomer on starch in presence of a redox catalytic system at room temperature.

In another aspect the present invention provides a process for preparation of superabsorbent polymer comprising graft polymerizing a monomer of acrylic acid compound on a polysaccharide using a redox catalyst system comprising ammonium persulfate, hydrogen peroxide and ascorbic acid.

In another aspect the present invention provides a process for preparation of polysaccharide-g-poly (2-propenamide-co-2-propenoic acid) or salts thereof.

In another aspect the present invention provides a process for preparation of starch-g-poly (2-propenamide-co-2-propenoic acid) or salts thereof.

In another aspect the present provides a method for production of superabsorbent polymer comprising
 a) graft polymerizing the monomer on the polysaccharide surface in presence of a redox catalytic system and a crosslinking agent to form a copolymer and
 b) neutralizing the copolymer to obtain granulated superabsorbent polymer.

In an aspect the present invention provides superabsorbent polymer having particle size for example in the range of 7500 micron to 75 micron which is about 3 mesh to 200 mesh.

In an aspect the present invention provides superabsorbent polymer having water absorbance capacity in the range of 200-2000 g/g.

Typically, water absorbance capacity of superabsorbent polymer can be measured by a method known in the art and one such method is disclosed in H. Omidiana et al., Polymer 40 (1999) 1753-1761.

In another aspect the present invention provides starch grafted poly acrylic acid/acrylamide having high water absorbing capacity ranging from 500 g/g to 980 g/g preferably in the range of 650 g/g to 800 g/g.

In an aspect the present invention provides a composition comprising at least one superabsorbent polymer produced by the present invention.

In an aspect the present invention provides a composition comprising at least one superabsorbent polymer of the present invention and optionally at least one plant advantageous additive.

In an aspect the present invention provides a multi-pack agricultural product comprising:
i) a container comprising at least one superabsorbent polymer of the present invention and optionally at least one plant advantageous additive.
ii) an instruction manual instructing an user to administer the content to a locus. In an aspect the present invention provides a method of increasing the water absorption capacity of a superabsorbent polymer, the method comprising contacting the superabsorbent polymer produced by the present invention with a plot of soil.

In another aspect the present invention provides a superabsorbent polymer produced by the present method having a water absorbance capacity ranging from 500 g/g to 980 g/g.

DETAILED DESCRIPTION OF THE INVENTION

Within the context of this specification, each term or phrase below will include the following meaning or meanings:

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of materials/ingredients used in the specification are to be understood as being modified in all instances by the term "about".

Thus, before describing the present invention in detail, it is to be understood that this invention is not limited to particularly exemplified systems or process parameters that may of course, vary. It is also to be understood that the terminology used herein is for the purpose of describing particular embodiments of the invention only and is not intended to limit the scope of the invention in any manner. The use of examples anywhere in this specification including examples of any terms discussed herein is illustrative only, and in no way limits the scope and meaning of the invention or of any exemplified term. Likewise, the invention is not limited to various embodiments given in this specification. Unless otherwise defined, all technical and scientific terms used herein have the same meaning as commonly understood by one of ordinary skill in the art to which this invention pertains. In the case of conflict, the present document, including definitions will control.

Those skilled in the art will recognize that the methods and compositions disclosed herein may be practiced without one or more of the specific details described, or with other methods, components, materials, etc. In some cases, well-known materials, components or method steps are not shown or described in detail. Furthermore, the described method steps, compositions, etc., may be combined in any suitable manner in one or more embodiments. It will also be readily understood that the methods and compositions of the embodiments as generally described herein could be arranged and designed in a wide variety of different configurations.

The order of the steps or actions of the methods described in connection with the embodiments disclosed may be changed as would be apparent to those skilled in the art. Thus, any order in the detailed description is for illustrative purposes only and is not meant to imply a required order.

It must be noted that, as used in this specification, the singular forms "a," "an" and "the" include plural referents unless the content clearly dictates otherwise. The terms "preferred" and "preferably" refer to embodiments of the invention that may afford certain benefits, under certain circumstances.

As used herein, the terms "comprising" "including," "having," "containing," "involving," and the like are to be understood to be open-ended, i.e., to mean including but not limited to.

As used herein, the term "room temperature" refers to temperatures for example from 15°-40° C., 15° C. to 30° C., and 15° C. to 24° C., 16° C. to 21° C., 20° C. to 30° C., 30° C. to 35° C. Such temperatures may vary by +5 to −5° C.

The term "SAP" as used herein means superabsorbent polymer.

The term "water absorption" as used herein means property of absorbing water when superabsorbent polymer is exposed to water. Water absorption capacity (WAC) consists of adding water or an aqueous solution to material, followed by sieving and quantification of the water retained by the gelled material in the Sieve.

In any aspect or embodiment described hereinbelow, the phrase comprising may be replaced by the phrases "consisting of" or "consisting essentially of" or "consisting substantially of" or "containing". In these aspects or embodiment, the combination or composition described includes or comprises or consists of or consists essentially of or consists substantially of the specific components recited therein or adjuvants or excipients not specifically recited therein. The terms "superabsorbent polymer" or "SAP" or "polymer gel" refer to water swellable polymers that can absorb water many times their weight in an aqueous solution. Without wishing to be bound by theory, the term superabsorbent polymers also apply to polymers that absorb water as well as de-sorb the absorbed water. The superabsorbent polymer may be selected from but not limited to water-swellable or water absorbing or water-retentive polymers such as cross-linked polymers that swell without dissolving in the presence of water, and may, absorb at least 10, 100, 1000, or more times their weight in water.

The term "a redox catalytic system" referred herein is a catalytic system comprising ammonium persulfate, hydrogen peroxide and ascorbic acid.

In an aspect the present invention provides a method for production of superabsorbent polymer.

In an aspect the present invention provides a process for preparation of superabsorbent polymer comprising graft polymerising a monomer of acrylic acid and a polysaccharide in presence of a redox catalytic system.

In an embodiment, the process comprising graft polymerizing a monomer onto a starch to form a starch graft copolymer, wherein the monomer comprising at least one α, β-unsaturated nitrile or carboxylic acid derivative. Typically, the monomer is selected from acrylic acid, acrylamide, methacrylamide, 2-acrylamido-2-methyl-propanesulfonic acid, methacrylic acid, vinyl sulfonic acid, ethyl acrylate, potassium acrylate, derivatives thereof or mixtures thereof.

The examples of monomers used in the invention include, but not limited to, acrylic acid or methacrylic acid, acrylamide or methacrylamide, sulfonic acids, such as 2-acrylamido-2-methyl-propanesulfonic acid (AMPS), vinyl sulfonic acid, acrylates, such as ethyl acrylate and potassium acrylate.

In one embodiment the monomer is acrylic acid.

In another embodiment, the monomer is a mixture of acrylic acid and acrylamide.

In alternative applications, acrylic acid may graft polymerize onto a starch or other polysaccharide without the assistance of acrylamide.

In an embodiment, the polysaccharide is super absorbent polymer.

In an embodiment, the super absorbent polymer is starch based super absorbent polymer.

In one embodiment, the superabsorbent polymer is Zeba™.

In an embodiment, the polysaccharide is starch.

The starch used in the above-described method include starches, flours, and meals. For example the starches include native starches (e.g., corn starch (Pure Food Powder, manufactured by A.E. Staley), waxy maize starch (Waxy 7350, manufactured by A. E. Staley), wheat starch (Midsol 50, manufactured by Midwest Grain Products), potato starch (Avebe, manufactured by A. E. Staley)), dextrin starches (e.g., Stadex 9, manufactured by A. E. Staley), dextran starches (e.g., Grade 2P, manufactured by Pharmachem Corp.), corn meal, peeled yucca root, unpeeled yucca root, oat flour, banana flour, and tapioca flour. The starch may be gelatinized to provide optimal absorbency. An exemplary starch is gelatinized corn starch. Furthermore, according to one embodiment, the mole ratio of the starch to the monomer is in the range of between about 1:1 and about 1:7.

In alternative embodiments, other polysaccharides, such as cellulose, may be used instead of starch. Accordingly, the monomers heretofore described may be graft polymerized onto cellulose for purposes of agricultural applications.

In an embodiment, the redox catalyst system may comprise initiators for example cerium (+4) salts, such as ceric ammonium nitrate; ammonium persulfate; sodium persulfate; potassium persulfate; ferrous peroxide; ferrous ammonium sulfate-hydrogen peroxide; L-ascorbic acid; and potassium permanganate-ascorbic acid. Other suitable initiators known to those skilled in the art may be used, such as alternative persulfates and peroxides, as well as vanadium, manganese, etc. The amount of initiator used may vary based on the chosen initiator, the selected monomer, and the chosen starch. The initiator may be added in a single or multiple steps at room temperature.

In one embodiment the process for preparing superabsorbent polymer comprising graft polymerizing a monomer onto a starch in the presence a redox catalytic system to form the starch graft copolymer at room temperature.

In another embodiment the process for preparing superabsorbent polymer comprising the steps of
  a) graft polymerizing a monomer onto a starch in the presence a redox catalytic system to form the starch graft copolymer;
  b) neutralizing starch graft copolymer and
  c) isolating granular super absorbent polymer.

In one embodiment the monomer is graft polymerized onto a starch in the presence of a redox catalytic system at room temperature.

The process of graft polymerization further comprises a crosslinking agent.

The examples of cross-linking agents include: glycerides; diepoxides; diglycidyls; cyclohexadiamide; methylene bis-acrylamide; bis-hydroxyalkylamides, such as bis-hydroxypropyl adipamide; formaldehydes, such as urea-formaldehyde and melamine-formaldehyde resins; isocyanates including di- or tri-isocyanates; epoxy resins, typically in the presence of a base catalyst; and derivatives and mixtures thereof.

In an aspect the present invention provides a process for preparation of superabsorbent polymer comprising graft polymerising a monomer of acrylic acid and a polysaccharide in presence of a redox catalytic system and cross-linking agent at room temperature.

In an embodiment the redox catalytic system comprising ammonium persulfate, hydrogen peroxide and ascorbic acid.

In an embodiment the cross-linking agent is methylene bis-acrylamide.

In an embodiment, the process for preparation of superabsorbent polymer is a batch process or continuous process.

Advantageously, the catalytic system used in the process aids to achieve polymerization at room temperature and provide the product with better water absorbance capacity and strength.

Another advantage associated with present invention is that utilities required for the heating and cooling for thermally initiated catalytic system is totally avoided which results in cost reduction of the process at commercial scale.

In an embodiment once a starch graft copolymer is formed, the pH of the starch graft copolymer may be adjusted to a desired value for the particular agricultural application. Alternative pH values may be desirable depending upon the type of soil and the type of crop the resulting SAPs will be applied to. The resulting pH for most agricultural applications typically will range from about 6.0 to about 8.0, preferably 7.0.

In an embodiment, the neutralization of the starch graft copolymer is performed using potassium hydroxide, potassium methoxide, or a mixture thereof.

In one embodiment, after neutralizing, the starch graft copolymer may then be isolated. In one exemplary method the neutralized dough of the polymer coming out is washed with solvent for example alcohol to obtain granulated product.

In one exemplary method the neutralized dough of the polymer coming out is granulated by mixing with solvent for example methanol in twin screw reactor in a continuous manner to obtain granules of SAP product.

For example, the SAP product may have a particle size of less than about 200 mesh. The desirable particle size may depend on the specific agricultural application intended. In one embodiment for agricultural applications that deposit the starch graft copolymer directly into the soil, the particle size may be less than 50 mesh, more particularly between about 5 mesh and 50 mesh, or between about 5 mesh and 25 mesh, or between about 8 mesh and about 25 mesh.

In another aspect the present invention provides a method of increasing the water absorption capacity of a superabsorbent polymer, the method comprising contacting the superabsorbent polymer produced by the present invention with a plot of soil. Typically, the super absorbent polymer product may be mixed with a solvent, such as water, to form a slurry. The resulting slurry may be applied to an agricultural medium such as a plant, root, seed, seedling, or directly to soil into which one of a plant, root, seed, or seedling will be planted.

In an embodiment a fertilizer or micronutrient may be added to the SAP product. The agricultural application of SAPs made by the above-described methods may result in earlier seed germination and/or blooming, decreased irrigation requirements, increased propagation, increased crop growth, increased crop production, and decreased soil crusting. Thus SAPs made by the methods disclosed herein are desirable for forming and using a SAP in large-scale agricultural applications.

The advantage of present invention further lies is retaining the desired water absorption properties without subjecting to plasticizing conditions.

It will be understood that the specification and examples are illustrative but not limitative of the present invention and that other embodiments within the spirit and scope of the invention will suggest themselves to those skilled in the art. Other embodiments can be practiced that are also within the scope of the present invention. The following examples illustrate the invention, but by no means intend to limit the scope of the claims.

EXAMPLE 1

Batch Process

Starch (82 g) was taken in water (700 g) in a homogenizer for 1 hour. The resultant mass was then transferred to a reaction kettle. The reaction mixture was stirred at 25-30° C. and Acrylic acid (82 g, 100%) was added, followed by a mixture of Acrylamide (41 g) and methylene bis acrylamide (200 mg) and ammonium persulfate (200 mg). To the reaction mixture hydrogen peroxide (160 mg) and Ascorbic acid solution (100 mg in 3 ml water) was added. The thick mass was stirred for 1 hr and then neutralized with potassium hydroxide solution to pH 7.2. The dough was washed by stirring with methanol (3.0 kg) to afford granulated product.

Weight-260 g, yield-97% with moisture content 6-7%
Water absorbing Capacity: 562 g/g

EXAMPLE 2

Continuous Process

Starch (82 g) was taken in water (700 g) in a homogenizer for 1 hour. To this resultant mass acrylic acid (82 g) was added followed by addition of Acrylamide (41 g) and methylene bis acrylamide (200 mg) and ammonium persulfate (200 mg) and hydrogen peroxide (160 mg). This mixture was introduced into a continuous twin screw reactor at the rate of 38.1 ml/min at 25° C. Through another port a solution of ascorbic acid (0.0031M) with a feed rate of 10 ml/min was introduced simultaneously to the reactor. The material coming out of the reactor was neutralized progressively in the neutralization chamber where a solution of potassium hydroxide is fed at a rate of 7 ml/min. The neutralized dough coming out is then granulated by mixing with methanol in another twin-screw reactor in continuous manner.

Weight-260 g/h, yield-97% with moisture content 6-7%
Water absorbing Capacity: 540 g/g

EXAMPLE 3

82 g starch was taken in 700 g water in a homogenizer for 1 hr. The resultant mass was then transferred to reactor fitted with ribbon paddle blades. The reaction mixture was stirred at 25-30° C. and 82 g (100%) of Acrylic acid was added, followed by a mixture of 41 g Acrylamide and 200 mg methylene bis acrylamide and 200 mg ammonium persulfate. Then 160 mg of hydrogen peroxide was added. 100 mg (in 3 ml water) Ascorbic acid solution was added. The thick mass was stirred for 1-1.5 hr and then neutralized with KOH solution to pH 7.2. The dough was washed by stirring with methanol (3.0 kg) to afford granulated product.

Weight-200 g, yield-74% with moisture content 6-7%
Water absorbing Capacity: 445 g/g

EXAMPLE 4

Reaction in the absence of ascorbic acid.

82 g starch was taken in 700 g water in a homogenizer for 1 hr. The resultant mass was the transferred to reaction kettle fitted with Teflon coated blade. The reaction mixture was stirred at 25-30° C. and 82 g (100%) of acrylic acid was added, followed by addition of mixture of 41 g acrylamide and 100 mg methylene bis acrylamide and 200 mg ammonium persulfate. Then 160 mg of Hydrogen peroxide was added and stirred for 2 hours. No polymerization occurred even after 2 hrs

EXAMPLE 5

82 g starch was taken in 700 g water in a homogenizer for 1 hr. The resultant mass was then transferred to reaction kettle. The reaction mixture was stirred and 82 g (100%) of Acrylic acid was added, followed by addition of a mixture of 41 g Acrylamide and 50 mg methylene bis acrylamide and 200 mg ammonium persulfate. Then 160 mg of hydrogen peroxide was added under stirring 100 mg (in 3 ml water) ascorbic acid solution. The thick mass was stirred for 1 hr and then neutralized with KOH solution to pH 7.2. The dough was washed with methanol (3.0) kg to afford granulated product.

Weight: 240 g (Yield-92%) with Moisture content 6-7%
Water absorbing Capacity: 265 g/g

EXAMPLE 6

82 g starch was taken in 700 g water in a homogenizer for 1 hr. The resultant mass was then transferred to reaction kettle. The reaction mixture was stirred and 82 g of Acrylic acid was added, followed by a mixture of 41 g Acrylamide and 100 mg methylene Bis acrylamide and 200 mg ammonium persulfate. Then 160 mg of hydrogen peroxide was added under stirring. 100 mg (in 3 ml water) Ascorbic acid solution was added. The thick mass was stirred for 1 hr and then neutralized with KOH solution to pH 7.2. The dough was washed with methanol (3.0 kg) to afford granulated product.

Weight: 256 g with moisture content 6-7%
Water absorbing Capacity: 780 g/g

EXAMPLE 7

82 g starch was taken in 700 g water in a homogenizer for 1 hr. The resultant mass was then transferred to reaction kettle. The reaction mixture was stirred at 25-30° C. and 82 g of acrylic acid was added, followed by a mixture of 41 g acrylamide and 100 mg methylene bis acrylamide and 240 mg AIBA (2,2'-Azobis(2-methylpropionamidine) dihydrochloride). This is followed by addition of 160 mg of hydrogen peroxide under stirring. 100 mg (in 3 ml) water ascorbic acid solution was added. The thick mass was stirred for 1 hr and then neutralized with KOH solution until pH 7.2. The dough was washed with methanol (3.0 kg) to afford granulated product.

Weight 259 g (Yield >98%) with moisture content 6-7%
Water absorbing Capacity: 700 g/g.

EXAMPLE 8

Continuous Process 1207 g starch was taken in 11666 g water in a homogenizer for 1 hr. To this resultant mass was added 1839 g of acrylic acid followed by 7.67 gm tetra ethylene glycol diacrylate, 0.345 gm AIBA (2,2'-Azobis(2-methylpropionamidine) dihydrochloride) and 0.16 gm hydrogen peroxide. This mixture was introduced into a continuous twin screw reactor at the rate of 38.1 ml/min at 30-32° C. Through another port was introduced simultaneously a solution of ascorbic acid (3.658 gm dissolved in 5 litre water) with a feed rate of 10 ml/min. Reactor kept under inert atmosphere with slow bubbling of Nitrogen. The material coming out of the reactor was neutralized progressively in the next neutralization chamber where a 22.5% solution of potassium hydroxide is fed at a rate of 7 ml/min.

The neutralized dough coming out is then granulated by mixing with methanol in another twin-screw reactor in continuous manner and dried.

Weight-520 g/h, yield-95% with moisture content 5-7%.
Water absorbing Capacity (WAC): 540 g/g.

We claim:

1. A method for producing a superabsorbent polymer comprising:
    a) graft polymerizing a monomer on a polysaccharide surface in the presence of a redox catalytic system to form a copolymer; and,
    b) neutralizing the copolymer to obtain a granulated superabsorbent polymer;
    wherein said redox catalyst system comprises cerium (+4) salts with at least one selected from the group consisting of: ceric ammonium nitrate; ammonium persulfate; sodium persulfate; potassium persulfate; ferrous peroxide; ferrous ammonium sulfate-hydrogen peroxide; L-ascorbic acid, and potassium permanganate-ascorbic acid;
    wherein said monomer is at least one selected from the group of: acrylamide; methacrylamide; 2-acrylamido-2-methylpropanesulfonic acid; methacrylic acid; vinyl sulfonic acid; ethyl acrylate; and, potassium acrylate, and
    wherein said graft polymerization is carried out at room temperature.

2. The method as claimed in claim 1, wherein said superabsorbent polymer is starch-g-poly (2-propenamide-co-2-propenoic acid) or a salt thereof.

3. The method as claimed in claim 1, wherein said graft polymerization further comprises a crosslinking agent.

4. The method as claimed in claim 3, wherein said crosslinking agent is at least one agent selected from the group of: glycerides; diepoxides; diglycidyls; cyclohexadiamide; methylene bis-acrylamide; bis-hydroxyalkylamides; formaldehydes; isocyanates; and epoxy resins.

5. The method as claimed in claim 1, wherein said method is performed in a continuous or a batch process.

6. The method as claimed in claim 1, wherein said superabsorbent polymer has a water absorbance capacity in the range of 500 g/g to 900 g/g.

7. A method of increasing water absorption capacity of a superabsorbent polymer, comprising:
    producing the superabsorbent polymer by graft polymerizing a monomer onto a starch in the presence a redox catalytic system at room temperature.

* * * * *